United States Patent [19]

van den Elshout

[11] Patent Number: 5,327,794

[45] Date of Patent: Jul. 12, 1994

[54] DEVICE FOR DRIVING A TOOL POSITIONED ON A PIVOTABLE PART

[75] Inventor: Johannes van den Elshout, Rotterdam, Netherlands

[73] Assignee: IHC Holland N.V., Sliedrecht, Netherlands

[21] Appl. No.: 987,723

[22] Filed: Dec. 9, 1992

[51] Int. Cl.[5] .................... F16H 35/00; F16H 1/14
[52] U.S. Cl. .................... 74/385; 74/417; 74/420; 37/336
[58] Field of Search ............ 74/385, 417, 420; 464/106, 109, 117, 162; 37/54, 58, 72; 901/26

[56] References Cited

U.S. PATENT DOCUMENTS

| | | | |
|---|---|---|---|
| 638,883 | 12/1899 | Perry | 37/72 X |
| 1,768,472 | 6/1930 | Frankie | 74/385 |
| 2,050,497 | 8/1936 | McCollum | 74/385 |
| 2,235,427 | 3/1941 | Harris | 74/385 |
| 2,507,844 | 5/1950 | Wright . | |
| 2,509,092 | 5/1950 | Faulkner | 74/385 X |
| 2,902,967 | 9/1959 | Wanzer . | |
| 3,051,120 | 8/1962 | Standal . | |
| 3,362,246 | 1/1968 | Bergstedt . | |
| 3,503,274 | 3/1970 | Howard | 74/417 X |
| 4,296,654 | 10/1981 | Mercer | 74/385 X |
| 4,576,545 | 3/1986 | Maeda | 901/26 X |
| 4,662,814 | 5/1987 | Suzuki et al. | 901/26 X |

FOREIGN PATENT DOCUMENTS

| | | | |
|---|---|---|---|
| 662941 | 7/1938 | Fed. Rep. of Germany | 74/385 |
| 332307 | 5/1903 | France . | |
| 363002 | 7/1906 | France . | |
| 1289678 | 2/1987 | U.S.S.R. | 901/26 |

*Primary Examiner*—Leslie A. Braun
*Assistant Examiner*—David W. Laub
*Attorney, Agent, or Firm*—Foley & Lardner

[57] ABSTRACT

Device for driving a tool (4) positioned on a pivotable part (2). The device comprises a combustion engine (5) or the like which is arranged stationary, such that the extension of the motor drive shaft (6) is perpendicular to and crosses the pivot axis (22) of the pivotable parts (2). The motor drive shaft drives a transmission shaft (26) by means of a bevel gear transmission (15, 16, 17). The transmission shaft is supported by the pivotable part (2) in such a way that the extension of the axis (36) of the transmission shaft is also perpendicular to and crosses the pivot axis (22). The wheel (16) that is located between the wheel (15) which is directly driven by the motor drive shaft (6) and the wheel (17) on the transmission shaft (26) has been mounted on a wheel shaft (18), the axis (21) of which coincides with the pivot axis (22) of the pivotable part (2).

5 Claims, 2 Drawing Sheets

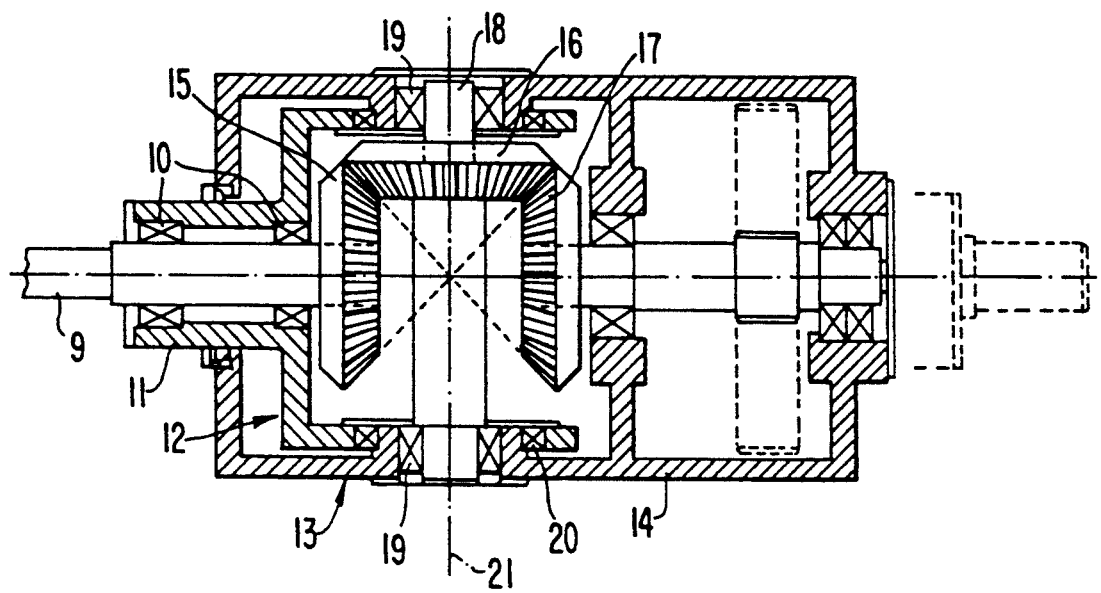
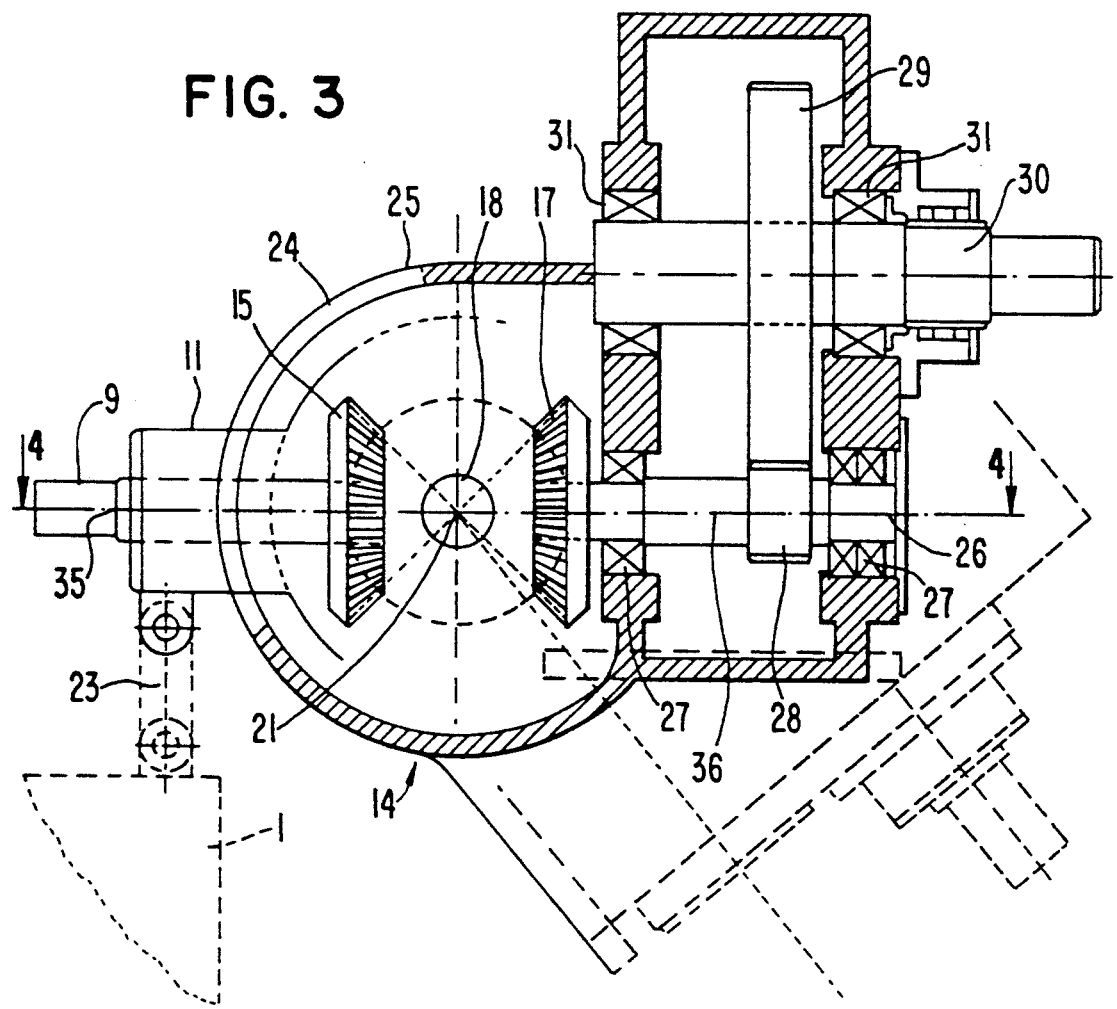

ously to the stationary part, so that the arm extends axially to the pivot shaft.

DEVICE FOR DRIVING A TOOL POSITIONED ON A PIVOTABLE PART

BACKGROUND OF THE INVENTION

The invention relates to a device for driving a tool positioned on a pivotable part. The device comprises a combustion engine or the like and coupling means between this engine and the tool.

In one example, a pump is positioned on a ladder of a suction dredger. The ladder is pivotably mounted to the dredger vessel. The lower end of the ladder, where the pump is located, can be operated at great depths beneath the water surface. The pump serves for suction of material from beneath the water and for pumping it into the vessel or to another place.

The engine for driving the pump is typically arranged on the ladder. It is positioned at the upper end of the ladder in order to obtain, the greatest possible distance above the water surface as possible. A shaft for transmitting the power produced by the motor to the pump extends along the ladder between the motor and the pump.

Here, power transmission is effected in a direct and simple way. However operating the motor and supplying it fuel are laborious. Also, the ladder will be exposed to loads and vibrations exerted on it by the motor. The ladder will have to be designed with a view to this environment and thus be made heavier. Therefore, pivoting the ladder will require more power than optimal. It is also possible that with fierce beating of the waves, water can sweep over the motor.

Another disadvantage is that the motor experiences position changes on pivoting the ladder. Therefore, the lubrication of the motor can be endangered. This will in particular occur in larger engines, with a relatively high pump power.

SUMMARY OF THE INVENTION

According to the invention, the device is designed such, that the motor remains stationary and the extension of the axis of the motor drive shaft crosses the pivot axis of the pivotable part and is perpendicular thereto. The motor drive shaft drives a transmission shaft by means of a bevel gear or crown gear transmission, said transmission shaft being pivotably supported by the pivotable part in such a way, that the extension of the axis of the transmission shaft likewise crosses the pivot axis of the pivotable part. The transmission shaft runs substantially parallel to the longitudinal axis of the pivotable part. Upon pivoting, the transmission shaft will be in the plane of the motor drive shaft. A wheel of the bevel gear or crown gear transmission is mounted on a wheel shaft, the axis of which coincides with the pivot axis of the pivotable part. The wheel is engaged with the wheels mounted on the motor drive shaft and the transmission shaft respectively. An output shaft is mounted on the pivotable part and runs parallel to or in line with the transmission shaft. The output shaft is driven by the transmission shaft and connects to the tool to be driven.

The stationary arrangement of the motor brings considerable advantages, while the tool, located on the pivotable part, is drivable through a relatively simple transmission.

In a simple way, a gear transmission can be mounted between the transmission shaft and the output shaft. Through this configuration, if required, the speeds of the shafts can differ from each other.

The transmission ratio between the motor drive shaft and the output shaft can also be controlled by adjustment of the bevel gear wheels e.g. crown gear wheels, or by mounting additional wheels in the input or output section of the transmission.

For protecting the bevel gear or crown wheel transmission against dirt and for facilitating lubrication of the various parts, these parts can be accommodated in a housing consisting of at least two sections, a first stationary section and a second section which can move along with the pivotable part, with the sections of the housing having been sealed in relation to each other.

In one configuration the wheel that is directly driven by the motor drive shaft can be mounted on an input shaft, which is supported by the stationary section of the housing. An intermediate shaft can be mounted between the input shaft and the motor drive shaft. This intermediate shaft can be extended and can be coupled to both shafts by cardan joints.

Through this configuration, tension and flexural strains not exerted on the motor drive shaft and the input shaft. These strains can occur when the one wheel of the bevel gear or crown wheel transmission is mounted directly on the motor drive shaft and a certain play arises in the bearings which support the pivotable part in relation to the pivot shaft. The undesirable strains can also occur when the axis of the motor drive shaft does not cross the axis of the pivot shaft of the pivotable part or is not perpendicular thereto.

Thus, an advantage of this configuration is that by application of the intermediate shaft, deviations in the position of the motor in relation to the pivot shaft of the pivotable part can be compensated for. Thus, on mounting the motor, the requirements of accuracy are less narrow.

Another feature of the invention is that the stationary section of the housing can be substantially located within the movable section. This configuration requires that the stationary section have two bearings, the axes of which are in line and coinciding with the axis of the pivot shaft. Also required are two bearings in the movable housing section which serve for supporting the wheel shaft. The stationary housing section is set at a distance from the axes of the bearings and outside of the movable housing section, having been pivotally connected to at least one arm, which in turn has been pivotally connected to a stationary part.

In this way it is achieved, that the second housing section can only perform a rotating movement in relation to the stationary section, so that the wheels of the bevel gear or crown gear transmission will always take the correct position in relation to each other. Through this, the occurring wear can be limited.

According to a further development of the invention, the wheel shaft in the stationary housing section will be supported in a bush being part of the stationary housing section and which projects outwardly through an elongated slot in the wall of the second housing section and has been connected to the arm extending between the stationary housing section and a stationary part, in which this wall of the second housing section, provided with the slot, has a bent shape, the centre of curvature of which coinciding with the axis of the pivot shaft of the pivotable part.

BRIEF DESCRIPTION OF THE DRAWINGS

The invention is further explained by way of an embodiment, illustrated in the drawings, in which:

FIG. 3 shows a cross-section substantially along the line 3—3 of FIG. 2 and partly a view of a part of FIG. 1 on an enlarged scale and in particular of the transmission between motor drive shaft and pump shaft with several parts left out; and FIG. 4 shows a cross-section of the transmission, substantially according to the line 4—4 of FIG. 3.

DESCRIPTION OF THE PREFERRED EMBODIMENT

Figure 1:
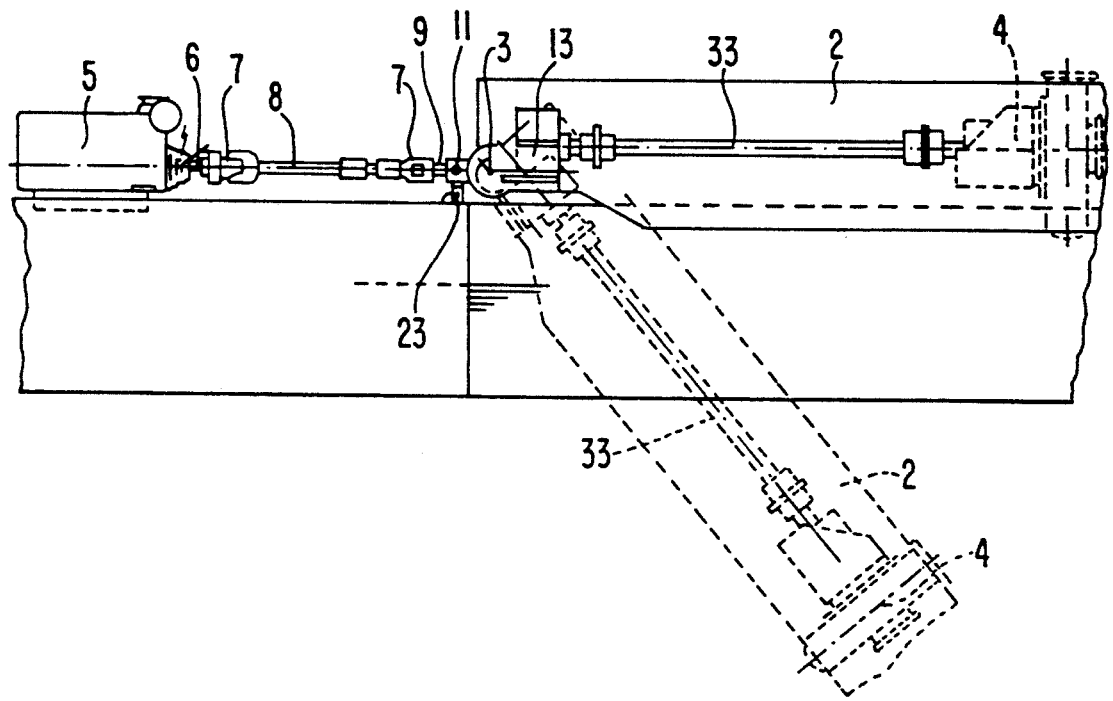
FIG. 1 diagrammatically shows a side view of a device according to the invention, applied on a suction dredger, with its ladder shown in two different positions.
Figure 2:
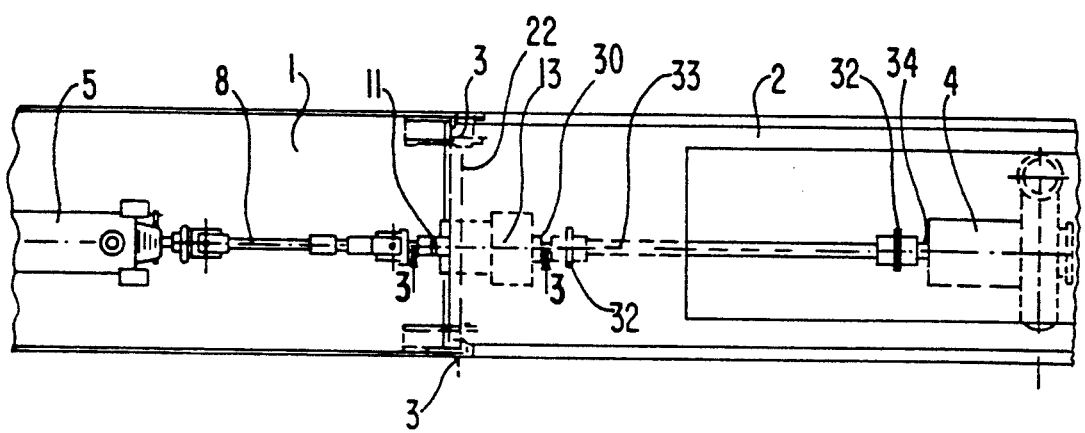
FIG. 2 diagrammatically shows a plan view of the device according to FIG. 1.

In the FIGS. 1 and 2, 1 indicates a dredger vessel or pontoon, on which the ladder 2 has been pivotably fastened in the pivot points 3.

In FIGS. 1 and 2 the ladder has been shown with full lines in the horizontal position, in which the dredger is out of operation. In FIG. 1, dash lines indicate the position of the ladder when it is in operation.

The pump 4 has been fastened to the ladder 2 and is to be driven by tale motor 5. The motor 5 has been arranged stationary on the deck of the vessel 1.

The motor 5 has a motor drive shaft 6, which has been connected to the intermediate shaft 8 by a cardan joint 7. The intermediate shaft 8 can have a telescopic part not further indicated and has its other end connected to the wheel shaft 9 by means of a cardan joint 7.

As appears from FIG. 4, the wheel shaft 9 is supported by the bearings 10 in a bush 11, which is part of a stationary section 12 of the housing 13. The housing 13 further comprises the section 14, which in a way yet to be described further is pivotably connected to the housing section 12. The housing section 12 has been coupled to the ladder 2 in a way not further indicated.

At the end opposite the intermediate shaft 8, the wheel shaft 9 has been provided with the bevel gear wheel 15, which is in engagement with a bevel gear wheel 16, which in turn is in engagement with the bevel gear wheel 17. The bevel gear wheel 16 has been mounted on the shaft 18, which is supported in the housing section 14 by means of the bearings 19. Concentric to the bearings 19, bearings 20 are present between the housing sections 12 and 14, so that the housing sections 12 and 14 are pivotably connected to each other. The axes 21 of the wheel shaft 18 and of the bearings 19 and 20 coincide with the pivot axis 22 of the ladder 2 and thus with true axes of the pivot points 3.

By one or more pivotally mounted arms 23, the bush 11 of the stationary housing section 12 has further been connected to a part stationary in relation to the motor 5, and to the vessel 1. The bush 11 extends through a slot 24 in the partially cylindrical wall 25 of the housing section 14.

The bevel wheel 17 has been mounted on the transmission shaft 26, which is supported in the housing section 14 by means of the bearings 27. On the shaft 26, a gear wheel 28 is located being in engagement with a gear wheel 29, mounted on the output shaft 30, which is supported in the housing section 14 by means of the bearings 31.

As appears from the FIGS. 3 and 4, all bevel gear wheels 15, 16 and 17 and the gear wheels 28 and 29 are located within the housing 13, so that dirt is prevented from getting between the wheels and the wheels can be lubricated.

By means of a coupling 32—see FIG. 2—the output shaft 30 has been connected to a drive shaft 33, which in turn has been connected to the shaft 34 of the pump 4 by means of a coupling 32.

By the way of arranging the bevel gear wheels 15, 16 and 17 described above, it is achieved that also on pivoting the ladder 2, the axis 35 of the shaft 9, which carries the bevel gear wheel 15, and the axis 36 of the shaft 26, which carries the bevel gear wheel 17, the axis 21 of the shaft 18 which carries the wheel 16, always cross each other perpendicularly. Through this, said wheels will always be in engagement under optimum conditions.

It will be obvious, that only one possible embodiment of a device according to the invention has been illustrated in the drawing and described above and that many modifications can be made without being beyond the inventive idea.

I claim:

1. A device driving a tool positioned on a pivotable part, said device comprising:

an engine;

coupling means between the engine and the tool, the engine being stationary and having a motor drive shaft with an axis, the extension of the axis of the motor drive shaft crossing a pivot axis of a pivotable part and being perpendicular thereto;

a pivotable transmission shaft, with a transmission axis, being driven by said motor drive shaft by means of a gear transmission, said transmission shaft being rotatably supported by the pivotable part such that said transmission axis crosses and is perpendicular to the pivot axis while the transmission shaft runs substantially parallel to a longitudinal axis of the pivotable part, and upon pivoting remains in a longitudinal plane of the motor drive shaft;

a first transmission wheel mounted on a wheel shaft, the axis of which coincides with the pivot axis of the pivotable part, said first transmission wheel being engaged with a motor drive shaft wheel driven by on the motor drive shaft, and a second transmission wheel mounted on the transmission shaft; and an output shaft driven by said transmission shaft mounted on the pivotable part, running parallel to the transmission shaft, connected to the tool to be driven.

2. The device of claim 1, further comprising a housing having at least two sections, sealed in relation to each other which can move in concert with the pivotable part, said housing accommodating said gear transmission.

3. The device according to claim 2, further comprising:

an input shaft connected to the motor drive shaft wheel, and an extendable intermediate shaft connected by cardan joints between the input shaft and the motor drive shaft.

4. The device according to claim 2 in which a first of said housing sections is substantially located within a second of said housing sections further comprising:

said first housing section containing two bearings, the axes of which are in line and coinciding with the axis of the pivot shaft of the pivotable part, said second housing containing two bearings, which are in line with the axis of the bearings contained in the first housing section, for supporting the wheel shaft and for supporting said first housing section at a distance from the axis of said bearings, said bearing being pivotally connected outside the second housing section to at least one arm, which in turn has been pivotally connected to a stationary part.

5. The device according to claim 1, in which the wheel shaft is supported in a bush which is part of the stationary housing section, said wheel shaft projecting outwardly through an elongated slot in a wall of a second housing section, and being connected to an arm extending between the stationary housing section and a stationary part, said wall having a bent shape with a center of curvature coinciding with the axis of the pivot shaft of the pivotable part.

* * * * *